(12) United States Patent
Jung et al.

(10) Patent No.: US 11,165,373 B2
(45) Date of Patent: Nov. 2, 2021

(54) MOTOR DRIVING APPARATUS

(71) Applicant: LG Electronics Inc., Seoul (KR)

(72) Inventors: Hansu Jung, Seoul (KR); Kwang Sik Kim, Seoul (KR); Chungill Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/630,374

(22) PCT Filed: Jul. 5, 2018

(86) PCT No.: PCT/KR2018/007635
§ 371 (c)(1),
(2) Date: Jan. 10, 2020

(87) PCT Pub. No.: WO2019/013491
PCT Pub. Date: Jan. 17, 2019

(65) Prior Publication Data
US 2020/0136538 A1 Apr. 30, 2020

(30) Foreign Application Priority Data

Jul. 11, 2017 (KR) .......................... 10-2017-0088065

(51) Int. Cl.
*H02P 6/18* (2016.01)
*H02P 21/22* (2016.01)

(52) U.S. Cl.
CPC ................ *H02P 6/18* (2013.01); *H02P 21/22* (2016.02); *H02P 2203/01* (2013.01)

(58) Field of Classification Search
CPC .......... H02P 6/18; H02P 25/089; H02P 21/00; H02P 23/20; H02P 23/30; H02P 21/22; H02P 2203/01
See application file for complete search history.

(56) References Cited

U.S. PATENT DOCUMENTS 7,825,620 B2 * 11/2010 Nakatsugawa ......... H02P 21/22
318/800
9,219,441 B2 * 12/2015 Yasui ........................ H02P 6/32
(Continued)

FOREIGN PATENT DOCUMENTS

EP    2448110      10/2011
JP    2010178609    8/2010
(Continued)

OTHER PUBLICATIONS

PCT International Search Report in International Application No. PCT/KR2018/007635, dated Sep. 28, 2018, 4 pages (with English translation).
(Continued)

*Primary Examiner* — Bickey Dhakal
(74) *Attorney, Agent, or Firm* — Fish & Richardson P.C.

(57) ABSTRACT

The present disclosure relates to a motor driving apparatus and, more specifically, to a motor driving apparatus which allows a maximum torque operation by correcting an angle error occurring during quick acceleration of a motor in a sensorless system. The motor driving apparatus comprises: an inverter for driving a motor, using an alternating current voltage; and a control unit for outputting a PWM signal for controlling an operation of a switching element included in the inverter. Here, the control unit determines an inductance parameter used to calculate a speed command value for determining a duty ratio of a PWM signal, and determines whether the motor is being accelerated, on the basis of a current change measured from the inverter. When the motor is being accelerated, the control unit enables a maximum torque operation by reducing an angle error of a rotor through a correction of reducing a previously-determined inductance parameter.

15 Claims, 8 Drawing Sheets

(56) References Cited

U.S. PATENT DOCUMENTS

| | | | | |
|---|---|---|---|---|
| 2008/0129243 A1* | 6/2008 | Nashiki | ................ | H02K 1/246 |
| | | | | 318/701 |
| 2014/0049202 A1* | 2/2014 | Fukumaru | ............... | H02P 21/24 |
| | | | | 318/400.32 |
| 2017/0104432 A1* | 4/2017 | Jebai | .................. | H02P 23/0077 |
| 2017/0250628 A1* | 8/2017 | Tian | ....................... | G06F 17/11 |

FOREIGN PATENT DOCUMENTS

| | | |
|---|---|---|
| JP | 2011045152 | 3/2011 |
| KR | 20020070890 | 9/2002 |
| KR | 20060011714 | 2/2006 |
| KR | 20080002630 | 1/2008 |
| KR | 20080079142 | 8/2008 |
| KR | 20100083919 | 7/2010 |
| KR | 20120054190 | 5/2012 |
| KR | 20150078662 | 7/2015 |
| KR | 101575038 | 12/2015 |

OTHER PUBLICATIONS

EP Extended European Search Report in European Appln. No. 18832517.9, dated Jun. 29, 2021, 8 pages.

\* cited by examiner

MOTOR DRIVING APPARATUS

CROSS-REFERENCE TO RELATED APPLICATIONS

This application is a National Stage application under 35 U.S.C. § 371 of International Application No. PCT/KR2018/007635, filed on Jul. 5, 2018, which claims the benefit of Korean Patent Application No. 10-2017-0088065, filed on Jul. 11, 2017. The disclosures of the prior applications are incorporated by reference in their entirety.

TECHNICAL FIELD

The present disclosure relates to a motor driving apparatus and, more specifically, to a motor driving apparatus which enables a maximum torque operation by correcting an angle error occurring during quick acceleration of a motor in a sensorless system.

BACKGROUND

Motors that are small and offer precise control are broadly classified as an AC motor, a DC motor, a brushless DC motor, and a reluctance motor.

Small-size motors have been used in various fields such as fields of AV devices, computers, domestic appliances and housing facilities, industries and the like. In particular, the small-size motors are widely used in the field of domestic appliances. Additionally, in recent years, demand for high-end home appliances has been increased. Accordingly, motors that are small, make less noise, consume less electricity and the like are required.

Among the motors, the BLDC motor, which has no brush and no commutator, generates no mechanical friction loss, no spark or no noise in principle, and is excellent in controlling speeds or torque. Additionally, the BLDC motor triggers no loss caused by control of speeds and is highly efficient as a small motor. Thus, the BLDC motor is usually used for home appliances.

The BLDC motor may include an inverter that supplies three-phase AC voltages, and a control unit that controls output voltages of the inverter. In this case, the control unit may control the inverter using a PWM control method.

A sensorless algorithm that does not use a position sensor (e.g., a hall sensor) may be used for the control method of the BLDC motor. In this case, the BLDC motor does not use the position sensor. Accordingly, production costs of motor driving apparatuses may be reduced.

In the system including a position sensor of the relater art, angle lagging of a rotor, which occurs during a quick acceleration operation of the motor, may be corrected by sensing position information on the rotor of the motor.

However, in a sensorless system that controls a motor using a sensorless algorithm without a position sensor, angle lagging, which occurs during a quick acceleration operation of the motor, may be corrected using an additional algorithm.

DISCLOSURE

Technical Problems

The present disclosure is directed to providing a motor driving apparatus that may correct an inductance parameter on the basis of whether a motor is being accelerated, thereby reducing an angle error of a rotor, which occurs during a quick acceleration operation of the motor, in a sensorless system.

Objectives of the present disclosure are not limited to what has been described. Additionally, other objectives and advantages that have not been mentioned may be clearly understood from the following description and may be more clearly understood from embodiments. Further, it will be understood that the objectives and advantages of the present disclosure may be realized via means and a combination thereof that are described in the appended claims.

Technical Solutions

A motor driving apparatus according to the present disclosure includes an inverter that drives a motor using an AC voltage, and a control unit that outputs a PWM signal controlling operations of a switching element included in the inverter. In this case, the control unit determines an inductance parameter used to calculate a speed command value for determining a duty ratio of the PWM signal, and determines whether the motor is being accelerated on the basis of a change in electric currents measured by the inverter. Next, when the motor is being accelerated, the control unit reduces an angle error of a rotor and enables a maximum torque operation through a correction of reducing the inductance parameter that is determined previously.

Advantageous Effects

The motor driving apparatus may correct an inductance parameter on the basis of whether a motor is being accelerated, thereby solving the problem of angle lagging that occurs during a quick acceleration operation of a motor in a sensorless system. Accordingly, the motor driving apparatus may reduce an angle error of a rotor. Additionally, the motor driving apparatus may improve performance of acceleration of the motor and may control the motor to enable the motor to perform a maximum torque operation. By doing so, the motor driving apparatus may improve reactivity of control and credibility of acceleration, thereby improving user satisfaction with the motor driving apparatus.

Detailed effects of the present disclosure are described together with the above-described effects in the detailed description of the disclosure.

DETAILED DESCRIPTION

Figure 1:
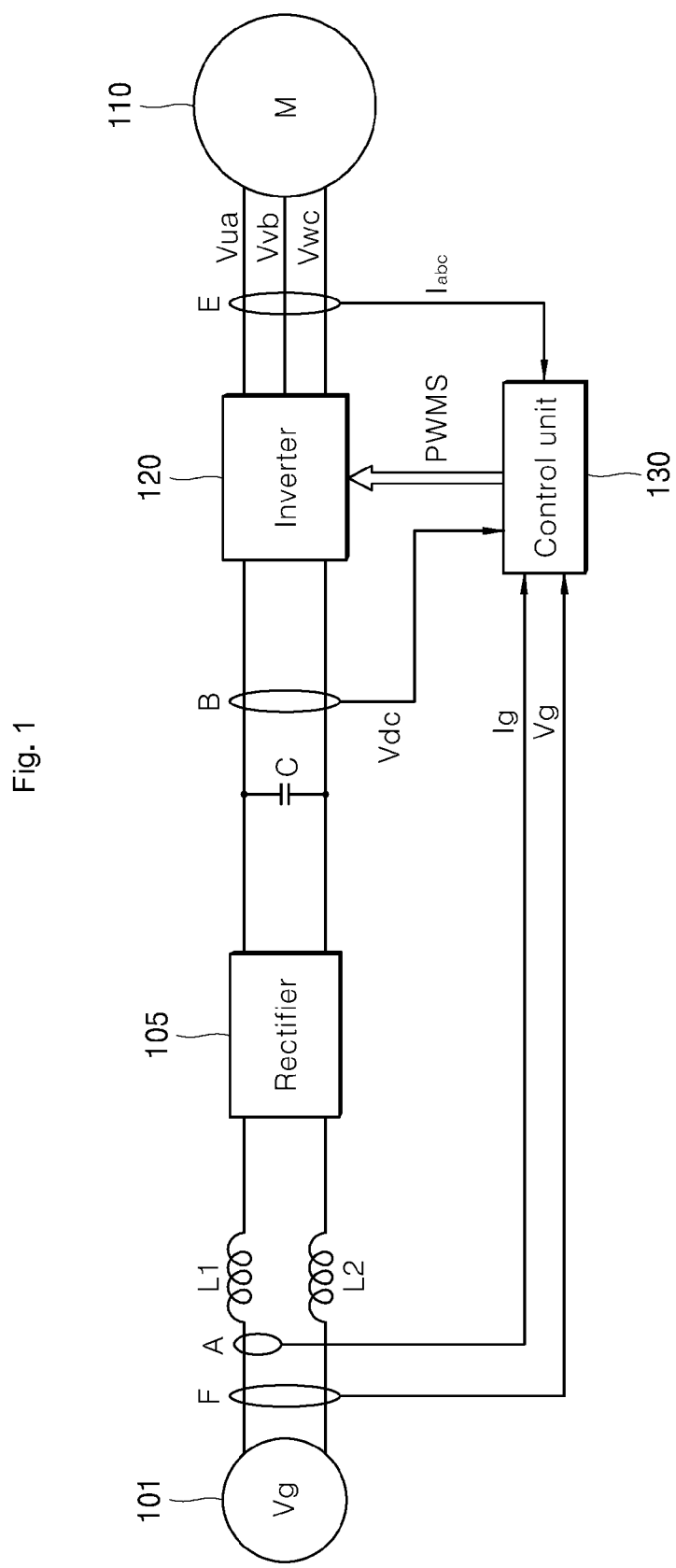
FIG. 1 is a block diagram illustrating a motor driving apparatus according to an embodiment of the present disclosure.

Advantages and features of the present disclosure, and a method for achieving the same may be clearly understood by referring to the following embodiments that are specifically described with reference to the accompanying drawings. The present disclosure, however, may be implemented in various different forms, and should not be construed as being limited only to the embodiments set forth herein. Rather, these embodiments are provided as examples so that the present disclosure will be thorough and complete and will fully convey the subject matter of the present disclosure to one having ordinary skill in the art to which the present disclosure pertains. The present disclosure should be defined by the scope of the appended claims. Throughout the drawings and description, like reference numerals denote like elements.

Unless otherwise defined, all the terms (including technical and scientific terms) used herein have the same meaning as commonly understood by one having ordinary skill in the art. It will be further understood that terms such as those defined in commonly used dictionaries should not be interpreted in an idealized sense or in an excessive way unless explicitly so defined herein.

Below, a motor driving apparatus according to an embodiment of the present disclosure is described with reference to FIGS. 1 to 9.

FIG. 1 is a block diagram illustrating a motor driving apparatus according to an embodiment of the present disclosure.

Referring to FIG. 1, the motor driving apparatus according to an embodiment of the present disclosure may include a motor 110, an inverter 120, and control unit 130.

The motor 110 may include a stator around which three-phase coils (not illustrated) are wound, and a rotor placed in the stator and rotated by a magnetic field generated in the three-phase coils.

When the three-phase coils are supplied with three-phase AC voltages (Vua, Vvb, Vwc) from the inverter 120, in the motor 110, a permanent magnet included in the rotor is rotated according to a magnetic field generated in the three-phase coils.

However, the motor 110 according to an embodiment of the present disclosure is not limited to a three-phase motor operated by three-phase coils. The motor 110, for example, may further include a single-phase motor using a single-phase coil. Below, features of the present disclosure are described in relation to a three-phase motor.

The motor 110 may include an induction motor, a blushless DC (BLDC) motor, a reluctance motor and the like. The motor 110, for example, may include a surface-mounted permanent-magnet synchronous motor (SMPMSM), an interior permanent magnet synchronous motor (IPMSM), a synchronous reluctance motor (Synrm) and the like.

The inverter 120 may include three-phase switching elements. When an operation control signal (referred to as "pulse width modulation (PWM) signal") supplied to the control unit 130 is input, the three-phase switching elements may perform switch-on and switch-off operations, may convert an input DC voltage (Vdc) into three-phase AC voltages (Vua, Vvb, Vwc), and may supply the three-phase AC voltages to the three-phase coils. The three-phase switching elements are specifically described hereunder with reference to FIG. 3.

When inputting a target command value, the control unit 130 may output a PWM signal (PWMS) that determines a switch-on time period for a switch-on operation and a switch-off time period for a switch-off operation of each three-phase switching element on the basis of the target command value and on the basis of an electrical angle position of the rotor.

The motor driving apparatus may further include an input current detector (A), a DC terminal voltage detector (B), a DC terminal capacitor (C), a motor current detector (E), an input voltage detector (F), an inductor (L1, L2) and the like. However, the present disclosure is not limited, and some of the above-described components may be omitted.

The input current detector (A) may detect input currents (Ig) input from a commercial AC power source 101. To this end, a current transformer (CT), a shunt resistance and the like may be used as the input current detector (A). Detected input currents (Ig), which are a pulse-type discrete signal, may be input to the control unit 130 for control of electric power.

The input voltage detector (F) may detect input voltages (Vg) input from the commercial AC power source 101. To this end, the input voltage detector (F) may include a resistance element, an amplifier and the like. Detected input voltages (Vg), which are a pulse-type discrete signal, may be input to the control unit 130 for control of electric power.

The inductor (L1, L2) may be placed between the commercial AC power source 101 and a rectifier 105, and may perform an operation of removing noise and the like.

The rectifier 105 rectifies the commercial AC power source 101 having passed through the inductor (L1, L2) and outputs the rectified commercial AC power source 101 rectified. The rectifier 105, for example, may be provided with a full bridge diode in which four diodes are connected but may be modified and applied in various ways.

The capacitor (C) stores input power. In the drawings, a single element is illustrated as the DC terminal capacitor (C), but a plurality elements may also be provided to ensure stability of elements.

The DC terminal voltage detector (B) may detect voltages (Vdc) of DC terminals that are both terminals of the capacitor (C). To this end, the DC terminal voltage detector (B) may include a resistance element, an amplifier and the like. Detected DC terminal voltages (Vdc), which are a pulse-type discrete signal, may be input to the control unit 130 for generation of a PWM signal (PWMS).

The motor current detector (E) detects output currents ($I_{abc}$) flowing between the inverter 120 and the three-phase motor 110. That is, the motor current detector (E) detects electric currents flowing through the three-phase motor 110. The motor current detector (E) may detect all output currents (ia, ib, ic) of each phase, and may also detect output currents of two phases using three-phase balancing.

The motor current detector (E) may be placed between the inverter 120 and the three-phase motor 110, and a current transformer (CT), a shunt resistance and the like may be used as the motor current detector (E) for detection of electric currents.

Detected output currents ($I_{abc}$), which are a pulse-type discrete signal, may be supplied to the control unit 130, and a PWM signal (PWMS) may be generated based on the detected output currents ($I_{abc}$).

Accordingly, the control unit 130 may control operations of the inverter 120 using input currents (Ig) detected by the input current detector (A), input voltages (Vg) detected by the input voltage detector (F), DC terminal voltages (Vdc) detected by the DC terminal voltage detector (B), and output currents ($I_{abc}$) detected by the motor current detector (E).

Figure 2:
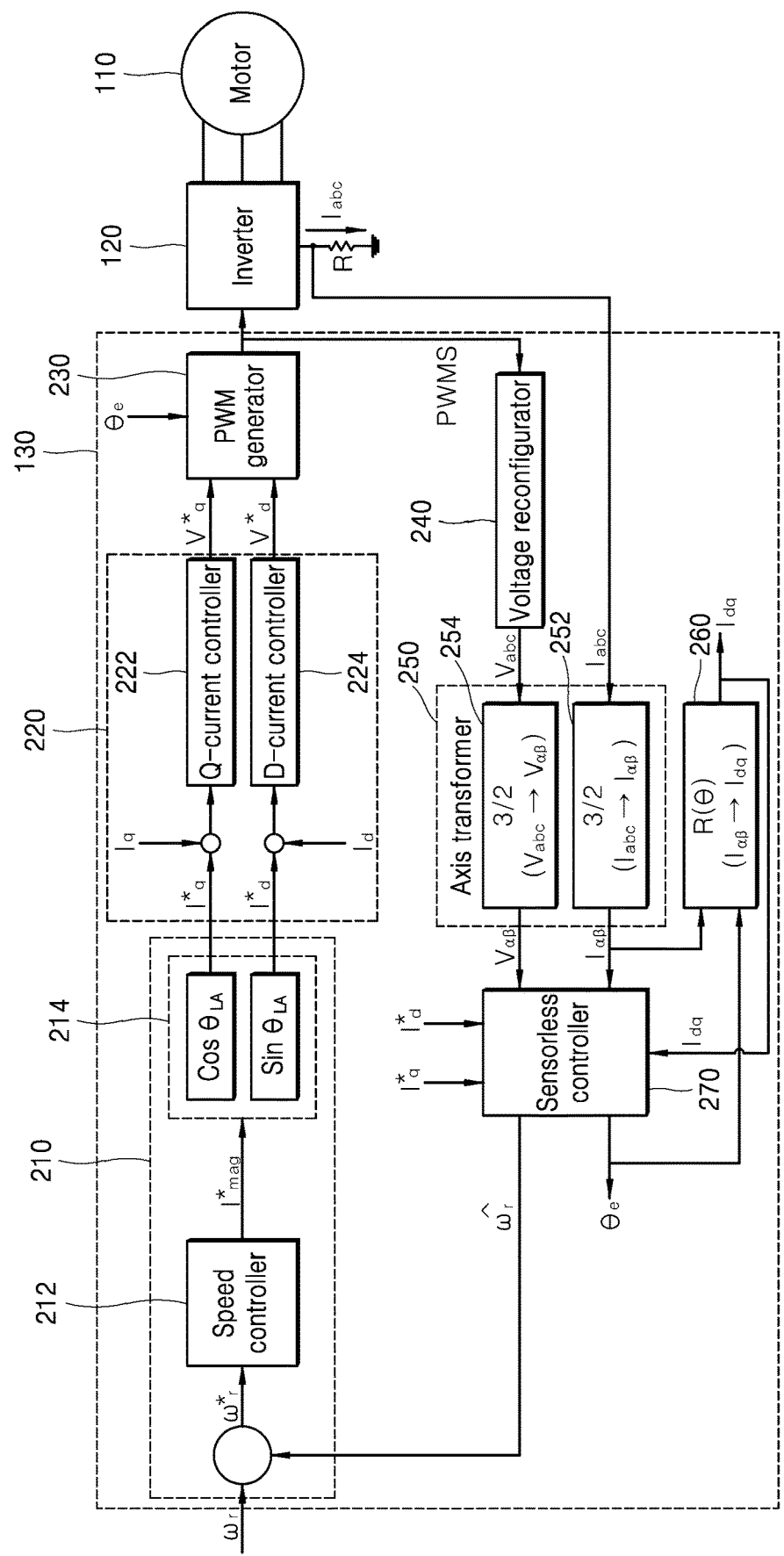
FIG. 2 is a block diagram illustrating components of the control unit in FIG. 1.

FIG. 2 is a block diagram illustrating components of the control unit in FIG. 1.

Referring to FIG. 2, the control unit 130 may include a current command generator 210, a voltage command generator 220, a PWM generator 230, a voltage reconfigurator 240, an axis transformer 250, an angle transformer 260, and a sensorless controller 270.

The current command generator 210 calculates a speed command value ($\omega^*_r$) on the basis of a calculated present speed ($\hat{\omega}_r$) and on the basis of a command speed ($\omega_r$) corresponding to an input target command value.

Next, the current command generator 210 generates a current command value (I*mag) on the basis of the speed command value ($\omega^*_r$). The current command generator 210, for example, may calculate a current command value (I*mag) in a speed controller 212 on the basis of the speed command value ($\omega^*_r$) that is difference between the present speed ($\hat{\omega}_r$) and the command speed ($\omega_r$)

Next, a current command transformer 214 may respectively generate a q-axis current command value ($I^*_q$) and a d-axis current command value ($I^*_d$) using the current command value (I*mag). In this case, a value of the d-axis current command value ($I^*_d$) may be set to 0. However, the present disclosure is not limited.

Additionally, though not explicitly illustrated in the drawing, the current command generator 210 may be further provided with a limiter (not illustrated) that limits a level of the current command value ($I^*_q$) such that the current command value ($I^*_q$) does not exceed an allowable range.

The voltage command generator 220 may generate a d-axis voltage command value ($V^*_d$) and a q-axis voltage command value ($V^*_q$) on the basis of d-axis and q-axis currents ($I_d$, $I_q$) that are axis-transformed as a rotary coordinate system and on the basis of the d-axis and q-axis current command values ($I^*_d$, $I^*_q$) generated by the current command generator 210.

The voltage command generator 220, for example, may generate a q-axis voltage command value ($V^*_q$) by performing PI control in a Q current controller 222 on the basis of a difference between the q-axis currents ($I_q$) and the q-axis current command value ($I^*_q$).

Additionally, the voltage command generator 220 may generate a d-axis voltage command value ($V^*_d$) by performing PI control in a D current controller 224 on the basis of a difference between the d-axis currents ($I_d$) and the d-axis current command value ($I^*_d$).

A value of the d-axis voltage command value ($V^*_d$) may be set to 0 in response to a value of the d-axis current command value ($I^*_d$) when the value of the d-axis current command value ($I^*_d$) is set to 0.

Though not explicitly illustrated in the drawing, the voltage command generator 220 may be further provided with a limiter (not illustrated) that limits a level of the d-axis and q-axis voltage command values ($V^*_d$, $V^*_q$) such that the d-axis and q-axis voltage command values ($V^*_d$, $V^*_q$) do not exceed an allowable range.

The d-axis and q-axis voltage command values ($V^*_d$, $V^*_q$) generated by the voltage command generator 220 may be input to the PWM generator 230.

The PWM generator 230 may receive an electrical angle position ($\theta_e$) calculated by the sensorless controller 270, and the d-axis and q-axis voltage command values ($V^*_d$, $V^*_q$).

Specifically, though not explicitly illustrated in the drawing, the PWM generator 230 may calculate three-phase output voltage command values (V*a, V*b, V*c), using the electrical angle position ($\theta_e$) and the d-axis and q-axis voltage command values ($V^*_d$, $V^*_q$).

Next, the PWM generator 230 may generate a PWM signal (PWMS) for an inverter according to a pulse width modulation (PWM) method on the basis of the three-phase output voltage command values (V*a, V*b, V*c) and may output the PWM signal (PWMS).

The PWM signal (PWMS) may be transformed into a gate driving signal in a gate driver (not illustrated) and may be input to gates of the three-phase switching elements in the inverter 120. Accordingly, the three-phase switching elements in the inverter 120 may perform a switching operation.

The PWM generator 230 may vary a switch-on time period and a switch-off time period of the PWM signal (PWMS) on the basis of the above-described electrical angle position ($\theta_e$) and the three-phase output voltage command values (V*a, V*b, V*c) and may control the switch operation of the three-phase switching elements.

The voltage reconfigurator 240 may reconfigure output voltages ($V_{abc}$) supplied to the inverter 120 on the basis of a PWM signal (PWMS) output by the PWM generator 230.

The axis transformer 250 may include a voltage axis transformer 252 and a current axis transformer 254.

The voltage axis transformer 252 receives output currents ($I_{abc}$) output from the inverter 120 or three-phase currents (Ia, Ib, Ic), and transforms the output currents ($I_{abc}$) and the three-phase currents (Ia, Ib, Ic) into two-phase currents ($I_{\alpha\beta}$) of the stationary coordinate system.

The current axis transformer 254 receives output voltages ($V_{abc}$) output from the voltage reconfigurator 240 or three-phase voltages (Va, Vb, Vc) and transforms the output voltages ($V_{abc}$) and the three-phase voltages (Va, Vb, Vc) into two-phase voltages ($V_{\alpha\beta}$) of the stationary coordinate system.

The transformed output currents ($I_{\alpha\beta}$) and output voltages ($V_{\alpha\beta}$) of the inverter 120 may be input to the sensorless controller 270.

The angle transformer 260 may transform two-phase currents ($I_{\alpha\beta}$) of the stationary coordinate system transformed by the current axis transformer 254 into two-phase currents ($I_{dq}$) of the rotary coordinate system.

The sensorless controller 270 may receive the transformed output currents ($I_{\alpha\beta}$) and output voltages ($V_{\alpha\beta}$), and, on the basis of the transformed output currents ($I_{\alpha\beta}$) and output voltages ($V_{\alpha\beta}$), may calculate a present speed ($\hat{\omega}_r$) and an electrical angle position ($\theta_e$) of the rotor.

Though not explicitly illustrated in the drawing, the sensorless controller 270 may receive current command values ($I^*_d$, $I^*_q$), and two-phase currents ($I_{dq}$) transformed by the angle transformer 260, and, on the basis of the current command values ($I^*_d$, $I^*_q$) and the two-phase currents ($I_{dq}$), may calculate a present speed ($\hat{\omega}_r$) and an electrical angle position ($\theta_e$) of the rotor.

Additionally, the sensorless controller 270 may estimate a position (H) of the rotor using output currents ($I_{\alpha\beta}$) and output voltages ($V_{\alpha\beta}$) of the inverter 120.

Next, the sensorless controller 270 may calculate a present speed ($\hat{\omega}_r$) and an electrical angle position ($\theta_e$) of the rotor, using at least one of the estimated position (H) of the rotor and the transformed output currents ($I_{\alpha\beta}$) and output voltages ($V_{\alpha\beta}$) of the inverter 120. The sensorless controller 270, for example, may calculate a present speed ($\hat{\omega}_r$) by dividing the position (H) of the rotor by time. However, the present disclosure is not limited.

Below, an example in which the sensorless controller 270 calculates a present speed ($\hat{\omega}_r$) and an electrical angle position ($\theta_e$) of the rotor on the basis of the d-axis and q-axis currents ($I_d$, $I_q$) is described.

Specifically, the sensorless controller 270 may calculate a flux vector ($\lambda_d$, $\lambda_q$) using vector values of the output currents ($I_d$, $I_q$) of the inverter 120 and the inductance parameter ($L_d$, $L_q$).

A relation between the output currents ($I_d$, $I_q$) and the flux vector ($\lambda_d$, $\lambda_q$) may be defined by the following formula (1).

$$\begin{bmatrix} \lambda_d \\ \lambda_q \end{bmatrix} = \begin{bmatrix} L_d & 0 \\ 0 & L_q \end{bmatrix} \begin{bmatrix} I_d \\ I_q \end{bmatrix} + \begin{bmatrix} \lambda_{PM} \\ 0 \end{bmatrix} \quad (1)$$

In the formula, $\lambda_d$ denotes a d-axis flux vector, $\lambda_q$ denotes a q-axis flux vector, $L_d$ denotes a d-axis inductance parameter, $L_q$ denotes a q-axis inductance parameter, $I_d$ denotes d-axis output currents, $I_q$ denotes q-axis output currents, and $\lambda_{PM}$ denotes flux coefficient.

The sensorless controller 270 may calculate a present speed ($\hat{\omega}_r$) and an electrical angle position ($\theta_e$) of the rotor using a flux vector ($\lambda_d$, $\lambda_q$). The calculation method may be easily drawn by one having ordinary skill in the art to which the present disclosure pertains with various formulas and algorithms. Accordingly, detailed description of the calculation method is omitted.

Below, the q-axis output currents ($I_q$) that affects torque of the motor 110 among the output currents ($I_d$, $I_q$) are described as an example. However, the present disclosure is not limited, and an algorithm the same as an algorithm in description provided below may be also applied to the d-axis output currents ($I_d$).

The sensorless controller 270 measures output currents ($I_q$).

Next, the sensorless controller 270 determines a value of an inductance parameter ($L_q$) corresponding to the output currents ($I_q$) using prestored data. In this case, data may be stored in a memory of the sensorless controller 270 in a lookup table form or in a regression equation form. Detailed description in relation this is provided hereunder with reference to FIG. 5.

Next, the sensorless controller 270 determines whether the motor 110 is being accelerated. That is, the sensorless controller 270 may determine whether the motor 110 is being accelerated, is operating at a fixed speed, or is being decelerated on the basis of a change in speeds of rotation of the motor 110.

In this case, the sensorless controller 270 may measure a change in speeds of rotation of the motor 110 on the basis of a change rate or a gradient of the output currents ($I_q$), and, on the basis of the measured change, may determine a state in which the motor 110 operates.

Next, when the motor 110 is being accelerated, the sensorless controller 270 corrects the value of the inductance parameter ($L_q$) that is determined previously.

The sensorless controller 270, for example, may correct the value of the inductance parameter ($L_q$) by multiplying the inductance parameter ($L_q$) by a predetermined correction ratio. In this case, the correction ratio may be within a range of less than 1. The correction ratio, for example, may be determined within a range of greater than 0.5 and less than 1.

By doing so, the sensorless controller 270 may perform a correction by reducing a size of the inductance parameter ($L_q$).

Additionally, the sensorless controller 270 may determine a correction ratio on the basis of a gradient of changes in speeds of the motor 110. In this case, the correction ratio may be determined in inverse proportion to the gradient of changes in speeds.

For example, when the gradient of changes in speeds of the motor 110 is relatively steep, a correction may be made by reducing the correction ratio and the size of the inductance parameter ($L_q$). Conversely, when the gradient of changes in speeds of the motor 110 is relatively gentle, a correction may be made by reducing the correction ratio and by increasing the size of the inductance parameter ($L_q$).

Even in the above-described case, the correction ratio may vary on the basis of the gradient of changes in speeds of the motor 110 within the range of less than 1. However, the present disclosure is not limited.

Next, when the sensorless controller 270 makes a correction by reducing the size of the inductance parameter ($L_q$), a value of the present speed ($\hat{\omega}_r$) of the rotor, output from the sensorless controller 270, may become small.

Accordingly, a difference between the present speed ($\hat{\omega}_r$) and the command speed ($\omega_r$) becomes great, and, on the basis of the change, the current command generator 210 generates an increased speed command value ($\omega^*_r$).

As the speed command value ($\omega^*_r$) is increased, the current command value ($I^*_q$) of the current command generator 210 is increased and the voltage command value ($V^*_q$) of the voltage command generator 220 is also increased.

Accordingly, the PWM generator 230 generates a PWM signal (PWMS) to which the increased voltage command value ($V^*_q$) is applied. For example, a duty ratio of the newly generated PWM signal (PWMS) may be increased.

The inverter 120 may control the motor 110 on the basis of the newly generated PWM signal (PWMS). Thus, the inverter 120 may control the motor 110 such that the motor 110 performs a quick acceleration operation.

That is, the motor driving apparatus of the present disclosure may solve the problem of angle lagging that occurs during a quick acceleration operation of the motor 110 in the sensorless system, by correcting the size of the inductance parameter ($L_q$). By doing so, the motor driving apparatus of the disclosure may reduce an angle error of the rotor. Additionally, the motor driving apparatus of the disclosure may improve performance of acceleration of the motor 110, and may control the motor 110 to enable the motor 110 to perform a maximum torque operation. Detailed description in relation to this is provided hereunder.

Figure 3:
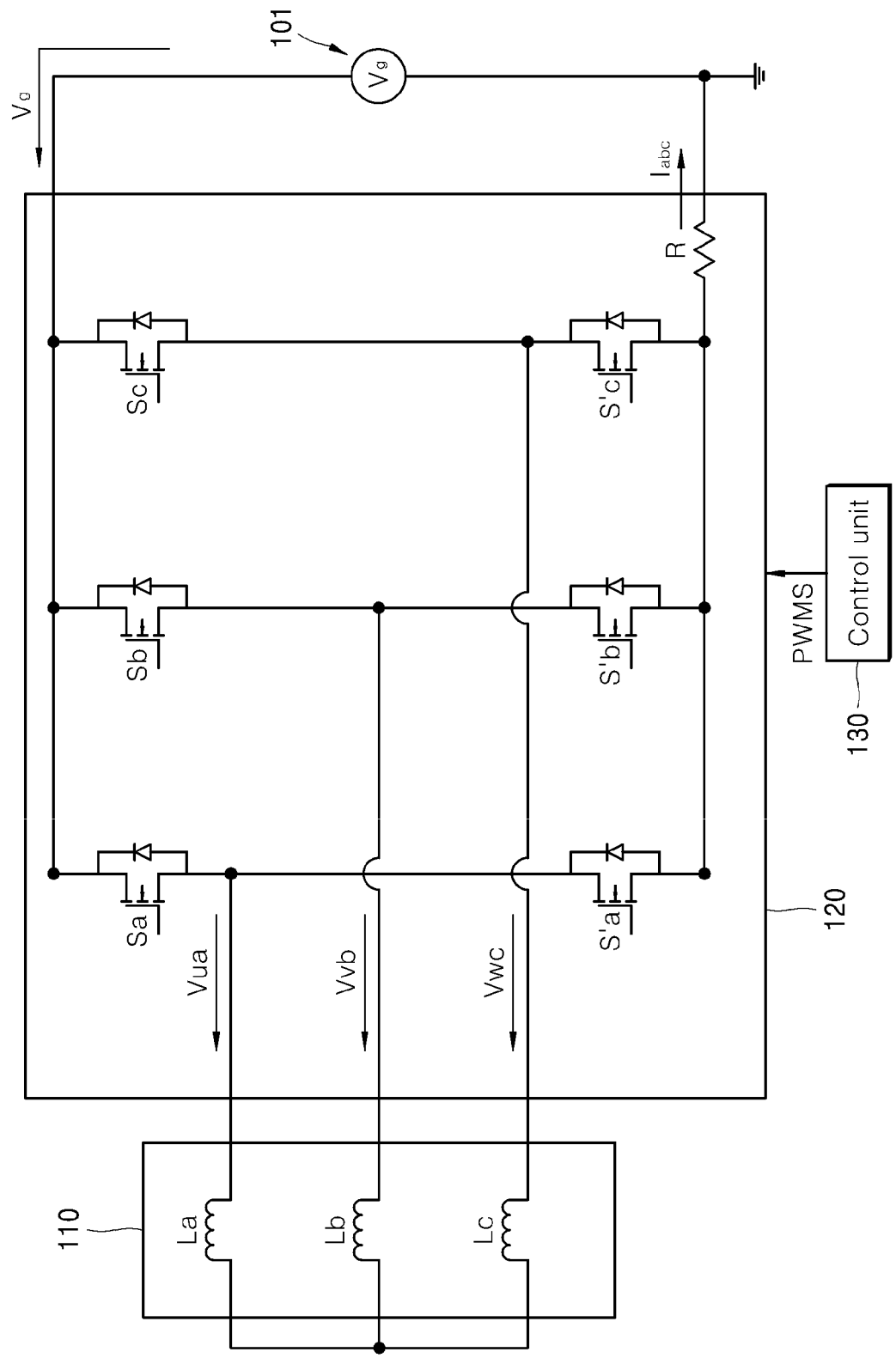
FIG. 3 is a circuit diagram illustrating the inverter in FIG. 1.

FIG. 3 is a circuit diagram illustrating the inverter in FIG. 1.

Referring to FIG. 3, the inverter 120 according to an embodiment of the present disclosure may include three-phase switching elements, and may convert input DC voltages ($V_dc$) into three-phase AC voltages (Vua, Vvb, Vwc) having a predetermined frequency or a predetermined duty and may output the three-phase AC voltages (Vua, Vvb, Vwc) to the motor 110, by performing switch-on and switch-off operations through a PWM signal (PWMS) supplied from the control unit 130.

The three-phase switching elements include first to third upper arm switches (Sa, Sb, Sc) and first to third lower arm switches (S'a, S'b, S'b) that are connected in series with each other and that are provided in pairs, and three pairs of first to third upper arm switches and first to third lower arm switches (Sa&S'a, Sb&S'b, Sc&S'c) in total may be connected in parallel with each other.

That is, the first upper and lower arm switches (Sa, S'a) supply a first-phase AC voltage (Vua) among the three-phase AC voltages (Vua, Vvb, Vwc) to a first-phase coil (La) among the three-phase coils (La, Lb, Lc) of the motor 110.

Additionally, the second upper and lower arm switches (Sb, S'b) may supply a second-phase AC voltage (Vvb) to a second-phase coil (Lb), and the third upper and lower arm switches (Sc, S'c) may supply a third-phase AC voltage (Vwc) to a third-phase coil (Lc).

Each of the first to third upper arm switches (Sa, Sb, Sc) and the first to third lower arm switches (S'a, S'b, S'b) may perform a switch-on-and-off operation once per one rotation of the rotor according to an input PWM signal (PWMS), may supply three-phase AC voltages (Vua, Vvb, Vwc) respectively to the three-phase coils (La, Lb, Lc), and may control operations of the motor 110.

The control unit 130 may deliver a PWM signal (PWMS) respectively to the first to third upper arm switches (Sa, Sb, Sc) and the first to third lower arm switches (S'a, S'b, S'b) and may control operations of the motor 110 such that three-phase AC voltages (Vua, Vvb, Vwc) are supplied to the three-phase coils (La, Lb, Lc).

Below, operations of the motor driving apparatus according to a sensorless algorithm are described with reference to FIG. 4.

Figure 4:
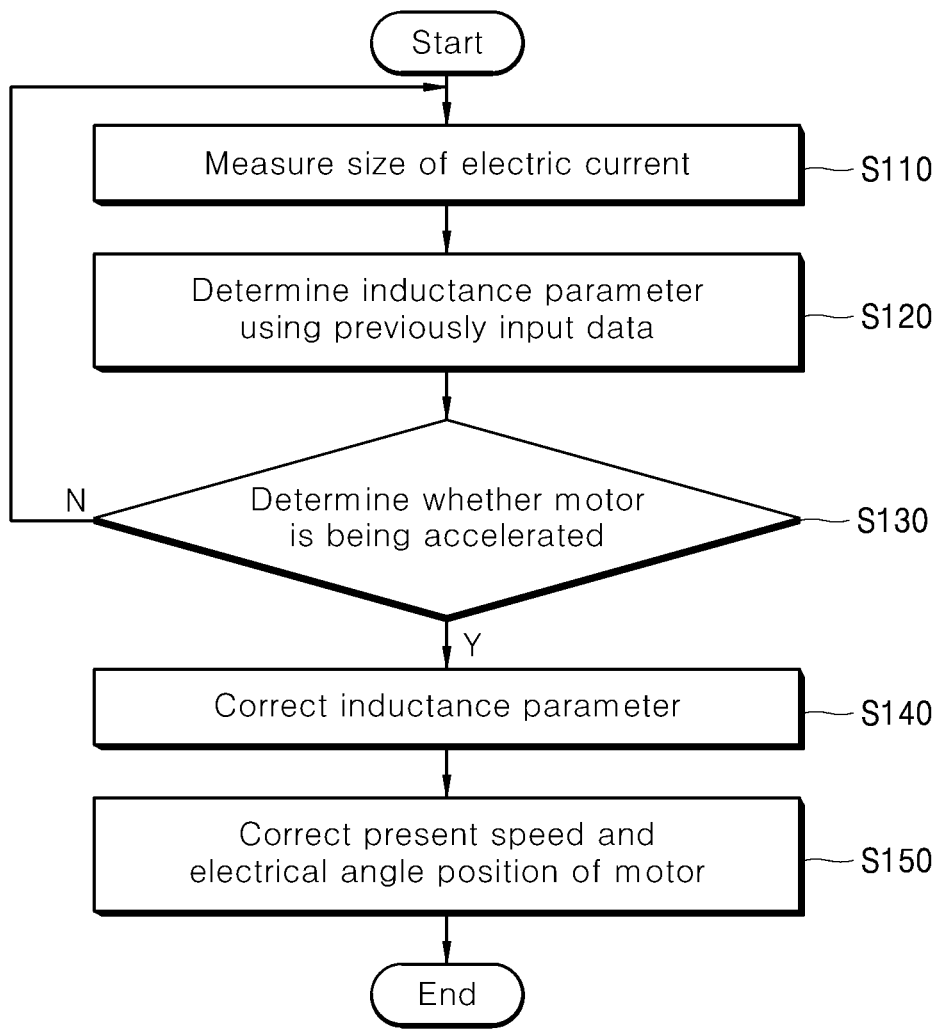
FIG. 4 is a flow chart for describing operations of a motor driving apparatus according to an embodiment of the present disclosure.
Figure 5:
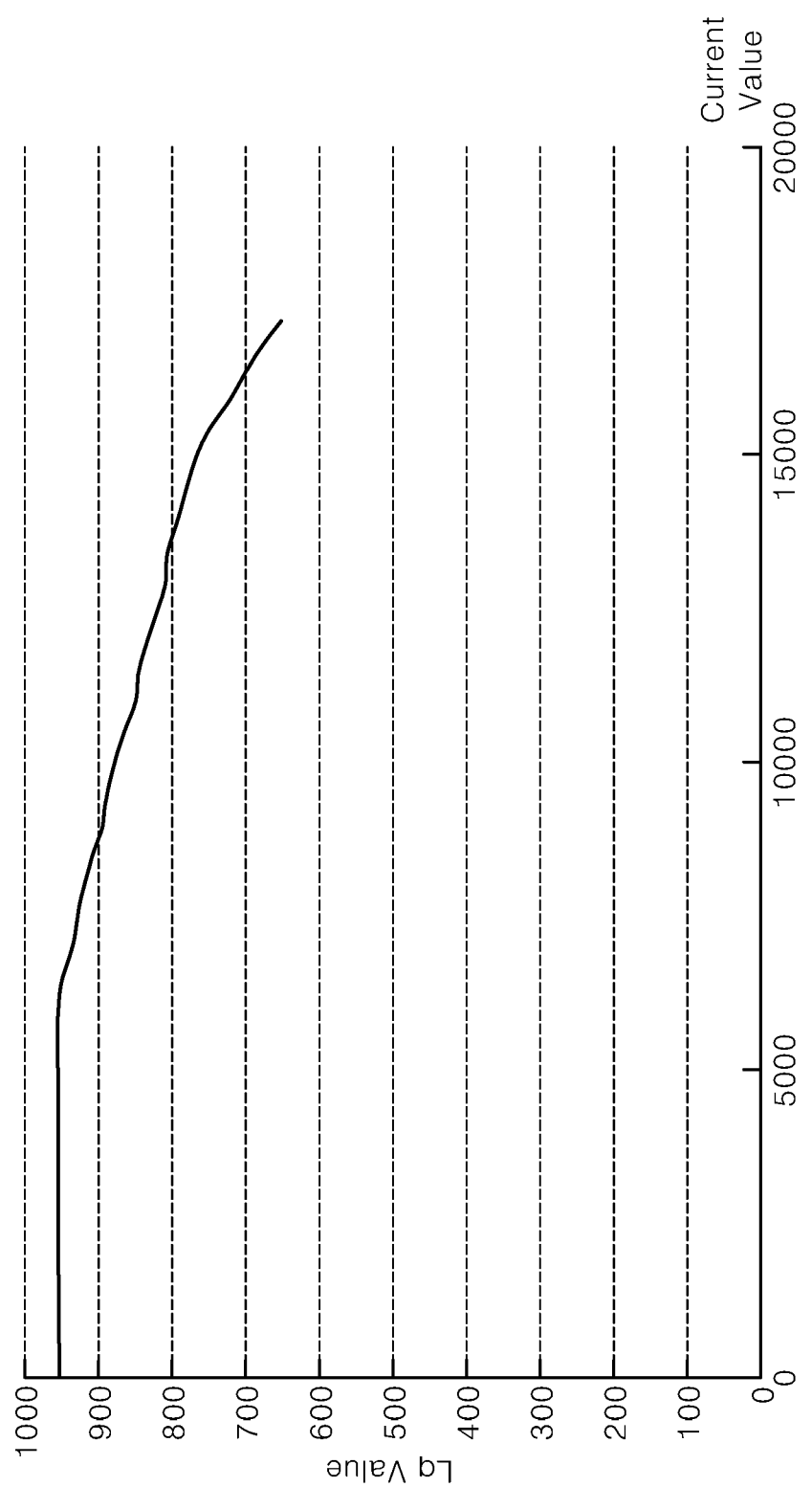
FIG. 5 is a graph for describing a method of determining an inductance parameter in FIG. 4.
Figure 6:
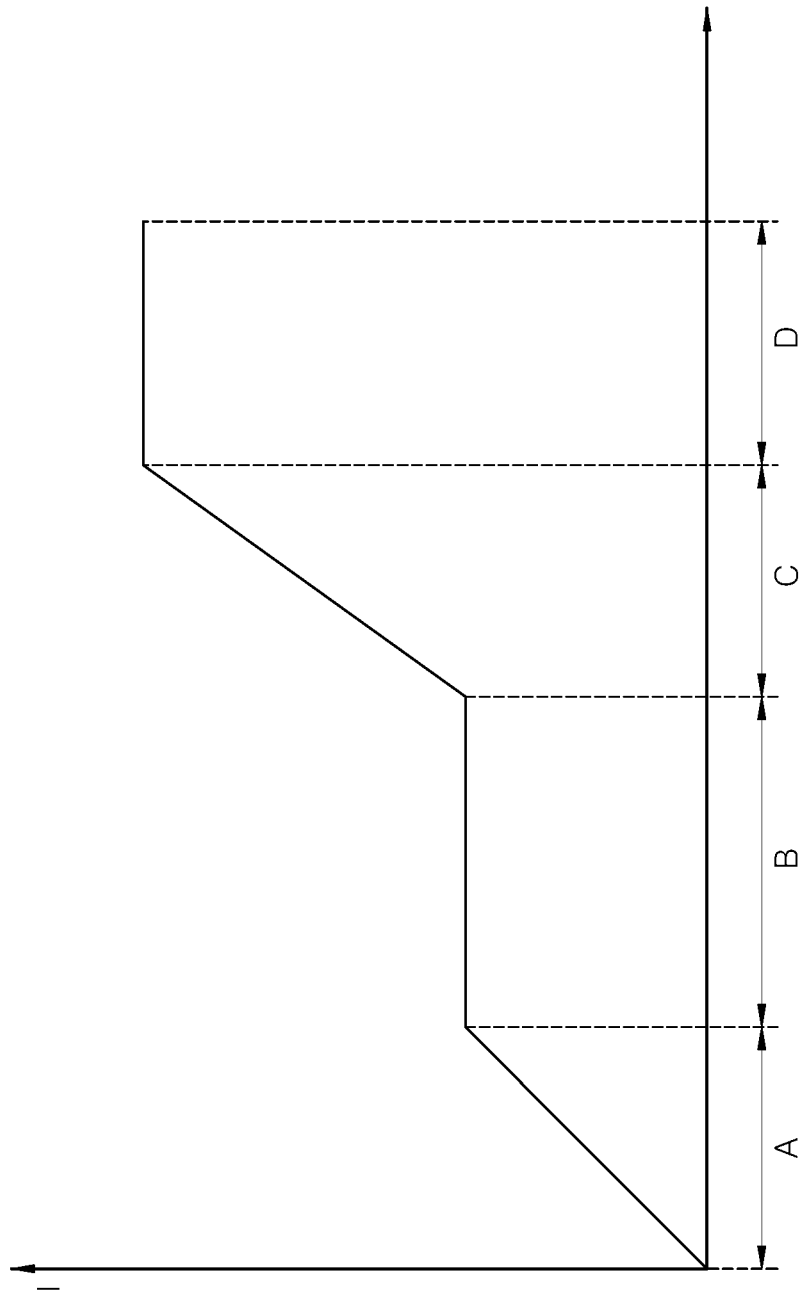
FIG. 6 is a graph for describing a determination as to whether a motor is being quickly accelerated in FIG. 4.

FIG. 4 is a flow chart for describing operations of a motor driving apparatus according to an embodiment of the present disclosure, FIG. 5 is a graph for describing a method of determining an inductance parameter in FIG. 4, and FIG. 6 is a graph for describing a determination as to whether a motor is being quickly accelerated in FIG. 4.

For convenience of description, description of details the same as the details described above is omitted. Below, differences are mainly described.

Referring to FIG. 4, in the motor driving apparatus according to an embodiment of the present disclosure, the control unit 130 first receives electric currents measured from the inverter 120 (S110).

In this case, the electric currents of the inverter 120 may be measured using a measurement resistance (R) included in the inverter 120. A coordinate axis of the measured electric currents, as described above, may be transformed by the axis transformer 250 and may be input to the sensorless controller 270. However, the present disclosure is not limited.

Next, the sensorless controller 270 determines an inductance parameter for calculating a speed command value (e.g., $\omega^*_r$) using previously input data (S120).

For example, referring to FIG. 5, the sensorless controller 270 may include data on a relation between an inductance parameter (e.g., $L_q$) and sizes of electric currents measured from the inverter 120.

A value of the inductance parameter may be previously set to correspond to the electric currents measured from the inverter 120 on a one-to-one basis. For example, when sizes of the electric currents measured from the inverter 120 are increased, a size of the inductance parameter may be reduced.

In this case, the data may be stored in the memory of the sensorless controller 270 in a look-up table form or in a regression equation from. However, this is provided only as an example, and the present disclosure is not limited.

Next, the sensorless controller 270 determines whether the motor 110 is being accelerated, on the basis of the sizes of the electric currents measured from the inverter 120 (S130).

Specifically, the sensorless controller 270 determines whether the motor 110 is being accelerated, on the basis of a change in the sizes of the electric currents measured from the inverter 120. Sizes of the electric currents measured from the inverter 120 may correspond to a present speed ($\omega^\wedge_r$) of the motor 110.

For example, referring to FIG. 6, section A and section C are acceleration operation sections in which sizes of electric currents are rapidly changed, and section B and section D are a fixed-speed operation section in which sizes of electric currents are constant.

However, FIG. 6 is a simplified view for describing a change in speeds of the motor 110, and electric currents actually measured from the inverter 120 may have a ripple value and a non-linear waveform.

In this case, the sensorless controller 270 may measure a change in the sizes of electric currents using an average of electric currents that is measured from the inverter 120 for a specific period of time. The change in the sizes of electric currents may correspond to a change in the speeds of the motor 110. The sensorless controller 270 may determine whether the motor 110 is being accelerated, using the change in the speeds of the motor 110 or a gradient of changes in the speeds of the motor 110 (i.e., the gradient of the graph of FIG. 6)

Next, when determining the motor 110 is being accelerated, the sensorless controller 270 corrects a size of the inductance parameter (S140).

Specifically, the sensorless controller 270 may correct the inductance parameter using a predetermined correction ratio. That is, the sensorless controller 270 may correct a value of the inductance parameter by multiplying the inductance parameter by the predetermined correction ratio.

In this case, the correction ratio may be in a range of less than 1. The correction ratio, for example, may be determined in a range of greater than 0.5. and less than 1. However, the present disclosure is not limited.

Additionally, the sensorless controller 270 may calculate a gradient of changes in the speeds of the motor 110 on the basis of electric currents measured from the inverter 120. The electric currents measured from the inverter 120 may be proportional to the speeds of the motor 110. Accordingly, a gradient of the electric currents measured from the inverter 120 may be proportional to the gradient of changes in the speeds of the motor 110.

In this case, the sensorless controller 270 may determine a correction value of the inductance parameter that is previously determined in step 120, on the basis of the gradient of changes in the speeds of the motor 110.

That is, the sensorless controller 270 may determine a correction ratio of the inductance parameter on the basis of the gradient of changes in the speeds of the motor 110. In this case, the correction ratio may be changed in inverse proportion to the gradient of changes in the speeds. However, the present disclosure is not limited.

For example, when the gradient of changes in the speeds of the motor 110 is relatively steep, a correction may be made by reducing the correction ratio and the size of the inductance parameter ($L_q$). Conversely, when the gradient of changes in the speeds of the motor 110 is relatively gentle, a correction may be made by reducing the correction ratio and by increasing the size of the inductance parameter ($L_q$). However, even in this case, the correction ratio may be changed based on the gradient of changes in the speeds of the motor 110 in a range of less than 1.

When determining the motor 110 is operating at a fixed speed or is being decelerated, the sensorless controller 270 repeats the above-described steps 110 to 130.

Next, the sensorless controller 270 corrects a present speed ($\omega\hat{}_r$) 110 and an electrical angle position ($\theta_e$) of the motor using the corrected inductance parameter (S150).

Specifically, the sensorless controller 270 may calculate a flux vector using vector values of the electric currents measured from the inverter 120 and the inductance parameter.

Below, a method of calculating a flux vector using vector values of electric currents and an inductance parameter, and operations of the control unit 130 according to the method are described with reference to FIGS. 7 to 9.

Figure 7:
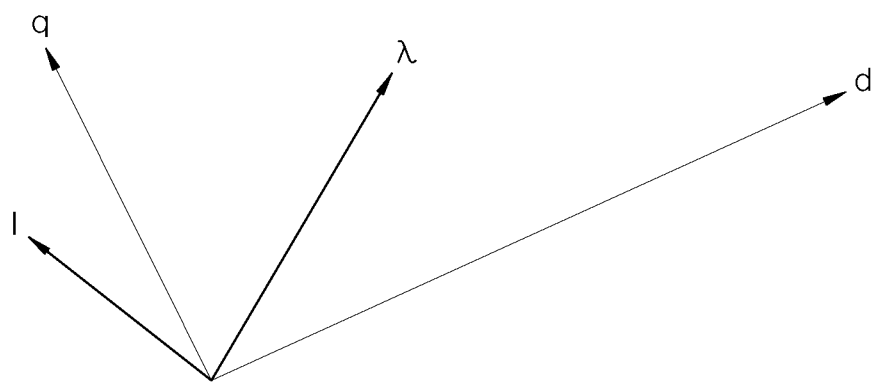
FIGS. 7 to 9 are views for describing operations of a control unit according to a flux vector
Figure 8:
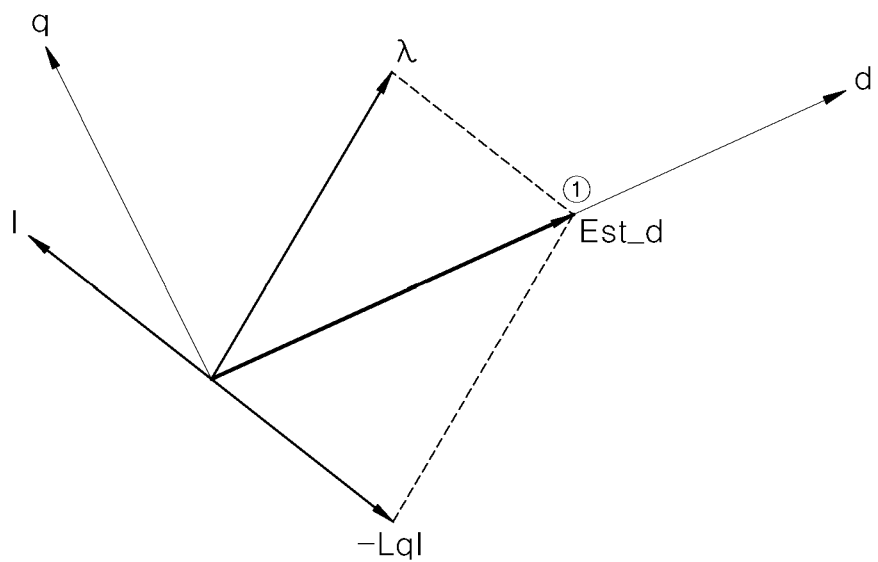
Figure 9:
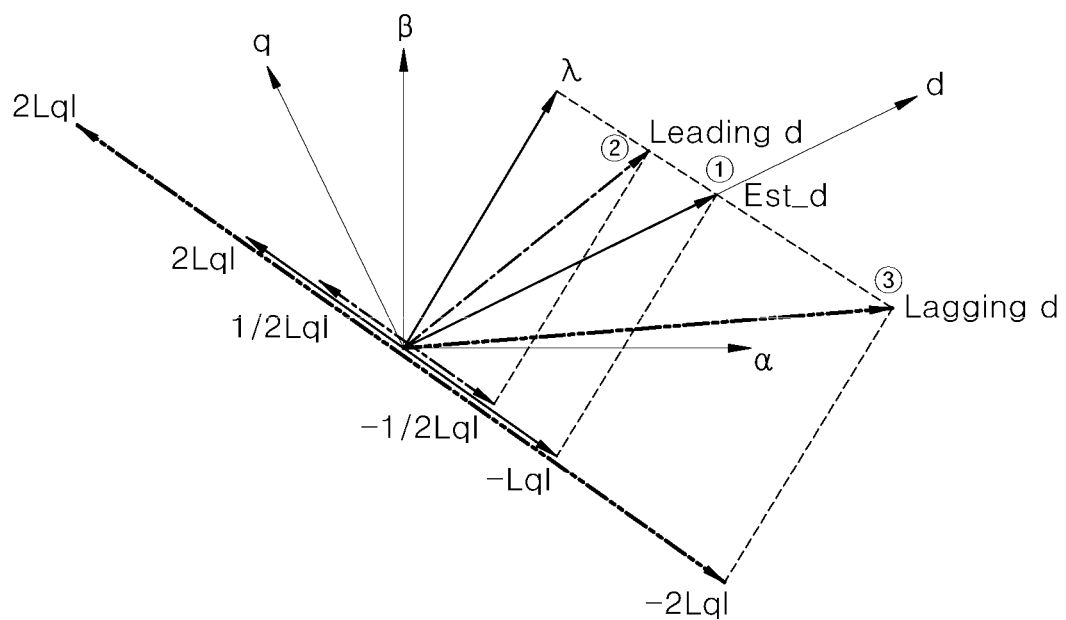

FIGS. 7 to 9 are views for describing operations of a control unit according to a flux vector.

FIG. 7 shows a current vector and a flux vector in an Interior permanent magnet synchronous motor (IPMSM) in a case in which a current angle is controlled in quadrant 2.

The current vector (I) and the flux vector ($\lambda$) are placed on the d-axis and the q-axis as in FIG. 7. In this case, the d-axis and the q-axis maintain 90 degrees all the time.

FIG. 8 shows an active flux vector (Est_d) corresponding to a composed vector of the current vector and the flux vector.

The sensorless controller 270, for example, may calculate a flux vector ($\lambda_d$, $\lambda_q$) using vector values of output currents ($I_d$, $I_q$) of the inverter 120 and an inductance parameter ($L_d$, $L_q$). A relation between the output currents ($I_d$, $I_q$) and the flux vector ($\lambda_d$, $\lambda_q$) may be defined by the following formula (1) that is described above.

$$\begin{bmatrix} \lambda_d \\ \lambda_q \end{bmatrix} = \begin{bmatrix} L_d & 0 \\ 0 & L_q \end{bmatrix} \begin{bmatrix} I_d \\ I_q \end{bmatrix} + \begin{bmatrix} \lambda_{PM} \\ 0 \end{bmatrix} \quad (1)$$

In the formula, $\lambda_d$ denotes a d-axis flux vector, $\lambda_q$ denotes a q-axis flux vector, $L_d$ denotes a d-axis inductance parameter, $L_q$ denotes a q-axis inductance parameter, $I_d$ denotes d-axis output currents, $I_q$ denotes q-axis output currents, and $\lambda_{PM}$ denotes flux coefficient.

Below, the q-axis output currents ($I_q$) that affects torque of the motor 110 among the output currents ($I_d$, $I_q$) are described as an example. However, the present disclosure is not limited, and an algorithm the same as an algorithm in description provided below may be also applied to the d-axis output currents ($I_d$).

According to the above-described formula, a current vector ($I_q$) may be scaled to an inductance parameter ($L_q$) and may be inversely converted. Next, a composed vector of the converted current vector ($I_q$) and flux vector ($\lambda_q$) becomes an active flux vector (Est_d).

The active flux vector (Est_d) may be matched with the D-axis.

FIG. 9 shows a change in the active flux vector (Est_d) on the basis of a change in sizes of the inductance parameter ($L_q$)

For example, when the size of the inductance parameter ($L_d$) is reduced to half, the active flux vector leads the D-axis. That is, the active flux vector has a lead angle with respect to the D-axis.

When the size of the inductance parameter ($L_d$) doubles, the active flux vector lags behind the D-axis. That is, the active flux vector has a lagging angle with respect to the D-axis.

Next, the sensorless controller 270 may calculate a present speed ($\omega\hat{}_r$) and electrical angle position ($\theta_e$) of the rotor using the active flux vector.

For example, when the sensorless controller 270 makes a correction by reducing the size of the inductance parameter ($L_q$), a value of the present speed ($\omega\hat{}_r$) of the rotor, output from the sensorless controller 270, may become small.

Accordingly, a difference between the present speed ($\omega\hat{}_r$) and the command speed ($\omega_r$) becomes great, and, on the basis of the change, the current command generator 210 generates an increased speed command value ($\omega^*_r$).

As the speed command value ($\omega^*_r$) is increased, the current command value ($I^*_q$) of the current command generator 210 is increased, and the voltage command value ($V^*_q$) of the voltage command generator 220 is also increased.

Accordingly, the PWM generator 230 generates a PWM signal (PWMS) to which the increased voltage command value ($V^*_q$) is applied. For example, a duty ratio of the newly generated PWM signal (PWMS) may be increased.

The inverter 120 may control the motor 110 on the basis of the newly generated PWM signal (PWMS). Thus, the inverter 120 may control the motor 110 such that the motor 110 performs a quick acceleration operation.

Specifically, as the size of the inductance parameter becomes small, the active flux vector has a lead angle relative to the d-axis and has a d value faster than an actual flux vector. Accordingly, the present speed ($\omega\hat{}_r$) used for control calculation is decreased, and, to correct this, the control unit 130 increases the speed command value ($\omega^*_r$).

That is, the control unit 130 corrects an angle error that occurs during the quick acceleration by increasing the speed command value ($\omega^*_r$). Accordingly, the control unit 130 may reduce an angle error between a control angle and actual magnetic polarity during the quick acceleration operation of the motor 110. By doing so, the control unit 130 may control the motor 110 to enable the motor 110 to perform a maximum torque operation (MTPA).

In conclusion, the motor driving apparatus of the present disclosure may solve the problem of angle lagging that occurs during a quick acceleration operation of the motor 110 in the sensorless system by correcting the size of the inductance parameter. That is, the motor driving apparatus of the disclosure may reduce an angle error of the rotor and, accordingly, may improve the performance of acceleration of the motor 110.

Additionally, the motor driving apparatus of the present disclosure may minimize time taken by the motor driving apparatus to respond to a user's request for quick acceleration, may improve stability in operations of controlling the motor, and may control the motor to enable the motor to perform a maximum torque operation.

The present disclosure has been described with reference to the embodiments illustrated in the drawings. However, the disclosure may be replaced, modified and changed by one having ordinary skill in the art to which the disclosure pertains in various different forms within the scope of the technical spirit of the disclosure. Therefore, the disclosure is not limited to the embodiments and the drawings set forth herein.

The invention claimed is:

1. A motor driving apparatus, comprising:
   an inverter configured to drive a motor; and
   a controller configured to output a pulse width modulation (PWM) signal for controlling operations of a switching element included in the inverter,
   wherein the controller is further configured to:
   determine an inductance parameter used to calculate a speed command value for determining a duty ratio of the PWM signal, calculate an active flux vector using the inductance parameter and a q-axis current vector that is extracted from electric currents measured from the inverter, calculate a present speed and an electrical angle position of the motor based on an angle between the active flux vector and a d-axis, correct a value of the determined inductance parameter based on whether the motor is being accelerated, based on the motor being accelerated, decrease the value of the inductance parameter such that the active flux vector has a lead angle with respect to the d-axis, and based on the active flux vector having the lead angle with respect to the d-axis, increase a current command value by increasing the speed command value.

2. The motor driving apparatus of claim 1, wherein the controller is configured to determine whether the motor is being accelerated based on a change in the electric currents measured from the inverter.

3. The motor driving apparatus of claim 2, wherein the controller is configured to decrease the value of the inductance parameter using a predetermined correction ratio, and wherein the correction ratio is determined based on a change in speeds of the motor.

4. The motor driving apparatus of claim 3, wherein the controller is configured to correct the value of the inductance parameter in inverse proportion to the change in speeds.

5. The motor driving apparatus of claim 1, wherein the inductance parameter is determined using a regression equation or a table prestored in the controller, based on the electric currents measured from the inverter, and wherein the controller is configured to, based on the motor being accelerated, correct a value of the determined inductance parameter based on a change in speeds of the motor.

6. The motor driving apparatus of claim 1, wherein the controller comprises:

a current command generator configured to generate the current command value using the speed command value calculated based on a command speed and the present speed of the motor, a voltage command generator configured to generate a voltage command value based on the current command value and the electric currents measured from the inverter, a PWM generator configured to output the PWM signal based on the voltage command value and the electrical angle position of the motor, and a sensorless controller configured to calculate the present speed and the electrical angle position of the motor based on a voltage reconfigured based on the PWM signal and the electric currents measured from the inverter.

7. The motor driving apparatus of claim 6, wherein the sensorless controller is configured to:

determine the inductance parameter corresponding to values of the electric currents measured from the inverter using a prestored regression equation or table, determine whether the motor is being accelerated based on a change of the electric currents measured from the inverter, and based on the motor being accelerated, decrease the value of the inductance parameter.

8. The motor driving apparatus of claim 7, wherein the sensorless controller is configured to correct the value of the inductance parameter in inverse proportion to a gradient of changes in speeds of the motor.

9. The motor driving apparatus of claim 8, wherein the sensorless controller is configured to:

based on an increase of the gradient of changes in speeds, decrease the value of the inductance parameter, and based on a decrease of the gradient of changes in speeds, increase the value of the inductance parameter.

10. A motor driving apparatus, comprising:

a motor that includes a stator around which three-phase coils are wound, the motor further including a rotor disposed in the stator and configured to be rotated by a magnetic field generated in the three-phase coils;

an inverter that includes three-phase switching elements configured to perform switch-on and switch-off operations to supply three-phase alternating current (AC) voltages to the three-phase coils and to cut off the three-phase AC voltages; and a controller configured to output a pulse width modulation (PWM) signal for controlling operations of the three-phase switching elements, wherein the controller is configured to:

determine an inductance parameter used to determine a duty ratio of the PWM signal, calculate an active flux vector using the inductance parameter and a q-axis current vector that is extracted from electric currents measured from the inverter, calculate a present speed and an electrical angle position of the motor based on an angle between the active flux vector and a d-axis, determine whether the motor is being accelerated based on a change in electric currents measured from the inverter, based on the motor being accelerated, decrease a value of the inductance parameter used such that the active flux vector has a lead angle with respect to the d-axis, and based on the active flux vector having the lead angle with respect to the d-axis, increase a current command value by increasing a speed command value.

11. The motor driving apparatus of claim 10, wherein the controller is configured to:

determine the value of the inductance parameter for calculating the speed command value based on values of the electric currents measured from the inverter, and based on the motor being accelerated, make a correction by reducing the value of the determined inductance parameter.

12. The motor driving apparatus of claim 10, wherein the inductance parameter is determined using values of the electric currents measured from the inverter and using a regression equation or a table prestored in the controller, and wherein the controller is configured to, based on the motor being accelerated, correct a value of the determined inductance parameter based on a gradient of changes in speeds of the motor.

13. The motor driving apparatus of claim 12, wherein the controller is configured to:

based on an increase of the gradient of changes in speeds, decrease the value of the inductance parameter, and based on a decrease of the gradient of changes in speeds, increase the value of the inductance parameter.

14. The motor driving apparatus of claim 10, wherein the controller comprises:

a current command generator configured to generate the current command value using the speed command value calculated based on a command speed and the present speed of the motor, a voltage command generator configured to generate a voltage command value based on the current command value and the electric currents measured from the inverter, a PWM generator configured to output the PWM signal based on the voltage command value and the electrical angle position of the motor, and a sensorless controller configured to calculate the present speed and the electrical angle position of the motor based on a voltage reconfigured based on the PWM signal and the electric currents measured from the inverter.

15. The motor driving apparatus of claim 14, wherein the sensorless controller is configured to correct the value of the inductance parameter in inverse proportion to a change in speeds of the motor.

* * * * *